United States Patent [19]

Kaiser et al.

[11] Patent Number: 5,659,195
[45] Date of Patent: Aug. 19, 1997

[54] CMOS INTEGRATED MICROSENSOR WITH A PRECISION MEASUREMENT CIRCUIT

[75] Inventors: William J. Kaiser, Los Angeles; Kristofer S. J. Pister, Pacific Palisades; Oscar M. Stafsudd, Los Angeles; Phyllis R. Nelson, Mar Vista; Amit Burstein, N. Hollywood, all of Calif.

[73] Assignee: The Regents of the University of California, Oakland, Calif.

[21] Appl. No.: 489,023

[22] Filed: Jun. 8, 1995

[51] Int. Cl.⁶ .................................................. H01L 29/82
[52] U.S. Cl. .......................... 257/415; 257/414; 257/431; 257/369; 257/618; 73/514.18
[58] Field of Search .................................. 257/414, 415, 257/431, 369, 618; 73/514.18

[56] References Cited

U.S. PATENT DOCUMENTS

| | | | |
|---|---|---|---|
| 3,662,595 | 5/1972 | Hurlburt et al. | 73/141 R |
| 4,009,607 | 3/1977 | Ficken | 73/141 R |
| 4,577,493 | 3/1986 | Oesterle | 73/81 |
| 4,584,885 | 4/1986 | Codwell | 73/862.61 |
| 4,598,586 | 7/1986 | Danielson | 73/517 B |
| 4,724,709 | 2/1988 | Antonazzi, Sr. et al. | 73/701 |
| 4,740,410 | 4/1988 | Muller et al. | 428/133 |
| 4,851,080 | 7/1989 | Howe et al. | 156/647 |
| 4,856,338 | 8/1989 | Phillippi et al. | 73/701 |
| 4,887,467 | 12/1989 | Sakuma et al. | 73/517 B |
| 4,891,982 | 1/1990 | Norling | 73/497 |
| 4,896,098 | 1/1990 | Haritonidis et al. | 324/663 |
| 4,922,159 | 5/1990 | Phillips et al. | 318/128 |
| 4,945,765 | 8/1990 | Roszhart | 73/517 |
| 4,987,779 | 1/1991 | McBrien | 73/517 B |
| 5,006,487 | 4/1991 | Stokes | 437/228 |
| 5,054,320 | 10/1991 | Yvon | 73/517 B |
| 5,103,667 | 4/1992 | Allen et al. | 73/1 D |
| 5,111,693 | 5/1992 | Greiff | 73/514 |
| 5,115,291 | 5/1992 | Stokes | 357/26 |
| 5,129,983 | 7/1992 | Greiff | 156/628 |
| 5,149,673 | 9/1992 | MacDonald et al. | 437/192 |
| 5,159,277 | 10/1992 | Mount | 324/721 |
| 5,164,328 | 11/1992 | Dunn et al. | 437/54 |
| 5,169,472 | 12/1992 | Goebel | 156/281 |
| 5,182,910 | 2/1993 | Benecke | 60/529 |
| 5,192,395 | 3/1993 | Boysel et al. | 156/643 |
| 5,195,371 | 3/1993 | Greiff | 73/505 |
| 5,209,818 | 5/1993 | Bol | 156/651 |
| 5,220,188 | 6/1993 | Higashi et al. | 257/467 |
| 5,220,189 | 6/1993 | Higashi et al. | 257/467 |
| 5,220,831 | 6/1993 | Lee | 73/497 |
| 5,236,118 | 8/1993 | Bower et al. | 228/193 |
| 5,252,294 | 10/1993 | Kroy et al. | 422/102 |
| 5,253,510 | 10/1993 | Allen et al. | 73/1 D |
| 5,254,209 | 10/1993 | Schmidt et al. | 156/626 |

(List continued on next page.)

*Primary Examiner*—Mark V. Prenty
*Attorney, Agent, or Firm*—Daniel L. Dawes

[57] ABSTRACT

Improved microsensors are provided by combining surface micromachined substrates, including integrated CMOS circuitry, together with bulk micromachined wafer bonded substrates which include at least part of a microelectromechanical sensing element. In the case of an accelerometer, the proof mass is included within the wafer bonded bulk machined substrate, which is bonded to the CMOS surface machine substrate, which has corresponding etch pits defined therein over which the wafer bonded substrate is disposed, and in the case of accelerometer, the proof mass or thin film membranes in the case of other types of detectors such as acoustical detectors or infrared detectors. A differential sensor electrode is suspended over the etch pits so that the parasitic capacitance of the substrate is removed from the capacitance sensor, or in the case of a infrared sensor, to provide a low thermal conductance cavity under the pyroelectric refractory thin film. Where a membrane suspended electrode is utilized over an etch pit, one or more apertures are defined therethrough to avoid squeeze film damping. Accelerometers built according to the methodology are provided with a nulling feedback voltage to maintain the switch DC voltage across sensing capacitors in a null condition and to maintain high sensitivity without requiring either a precision transformer or regulated power sources in the capacitance bridge of the accelerometer.

12 Claims, 4 Drawing Sheets

U.S. PATENT DOCUMENTS

| | | | |
|---|---|---|---|
| 5,262,000 | 11/1993 | Welbourn et al. | 156/643 |
| 5,273,939 | 12/1993 | Becker et al. | 437/209 |
| 5,277,053 | 1/1994 | McLane et al. | 73/10 |
| 5,281,836 | 1/1994 | Mosser et al. | 257/254 |
| 5,287,724 | 2/1994 | White et al. | 73/1 D |
| 5,289,719 | 3/1994 | Egley et al. | 73/497 |
| 5,290,400 | 3/1994 | Bobbio | 156/655 |
| 5,311,140 | 5/1994 | Permuy | 324/680 |
| 5,325,065 | 6/1994 | Bennett et al. | 324/661 |
| 5,331,236 | 7/1994 | Sexton | 310/40 MM |
| 5,331,852 | 7/1994 | Greiff et al. | 73/505 |
| 5,331,854 | 7/1994 | Hulsing, II | 73/517 |
| 5,338,416 | 8/1994 | Mlcak et aql. | 204/129.3 |
| 5,341,682 | 8/1994 | Hulsing, II | 73/505 |
| 5,343,064 | 8/1994 | Spangler et al. | 257/350 |
| 5,343,766 | 9/1994 | Lee | 73/862.61 |
| 5,345,824 | 9/1994 | Sherman et al. | 73/517 B |
| 5,352,918 | 10/1994 | Thomas et al. | 257/417 |

CMOS INTEGRATED MICROSENSOR WITH A PRECISION MEASUREMENT CIRCUIT

BACKGROUND OF THE INVENTION

1. Field of the Invention

The invention relates to the field of microelectromechanical systems (MEMS), and in particular to a CMOS integrated microsensor and a precision measurement circuit for use in such a microsensor.

2. Description of the Prior Art

Very large scale microelectronic products have experienced rapid growth because of the great diversity of system functions which can be provided within a single package. Applications for these devices range from low noise radio circuits through audio, video and high power automotive control systems. However, regardless of the application, all such MEMS rely on the same basic technology components. In particular, the extension of the intrinsically flexible very large scale integrated (VLSI) manufacturing techniques, which when extended to microsensors and microactuators, offers a wide range of new product opportunities. However, in contrast to conventional VLSI systems, microsensor systems must accept a much wider range of input phenomena than conventional electronics. For example, analog and digital VLSI systems, process well-defined electrical input signals. Microsensor systems receive analog and digital electrical inputs, but in addition thereto, must measure temperature, pressure, strain, acceleration, rotation, infrared radiation, chemical properties of liquids and gasses, and a variety of other physical inputs. It is in fact a challenges to develop sensors which respond selectively to only one input. In addition, diverse microsensor manufacturing is complicated by the need for integrating many different structures at a low cost point.

Conventional surface micromachining methods provide combined micromechanical elements and integrated electronics. However, the mechanical structures are inherently microscopic in mass, polycrystalline and typically thin film structures. Thus, for many applications which require large mass, single crystal structures, or materials incompatible with surface micromachining, such as refractory metal oxide piezoelectric or pyroelectric materials, surface micromachining as a process is limited in its scope. In addition, conventional structures and points service micromachining capacitive position sensor are limited by the presence of large parasitic capacitance to the supporting substrate.

Conventional bulk micromachining methods offer precise, single crystal structures which are ideal for many sensing applications and may be compatible with high temperature materials. However, to avoid the attenuating effects of parasitic capacitance, conventionally bulk machine structures have required glass supporting substrates. Typical bulk micromachine devices are not compatible with integrated electronics.

Therefore, what is needed is a process in which microsensors may be manufactured that provides great sensor diversity on a common platform. The process should be able to accommodate new designs and provide a method for eliminating critical electronic measurement limitations which have heretofore seriously constrained conventional surface and bulk micromachined sensor structures.

BRIEF DESCRIPTION OF THE INVENTION

The invention is a CMOS integrated microsensor comprising a first micromachined semiconductor substrate having surface micromachined therein an etch pit and a CMOS circuit fabricated within the first substrate. A wafer bonded second substrate is disposed on the first substrate over the etch pit. The wafer bonded second substrate is bulk micromachined to include at least a portion of a sensor element within the second substrate and is bonded to the first substrate at temperatures below CMOS critical temperatures, which would affect the CMOS circuit. As a result, the microsensor is fabricated utilizing fabrication advantages of CMOS process and combined with microelectromechanical structures as fabricated by bulk machined processes.

In one embodiment the microsensor is an accelerometer and the wafer bonded second substrate comprises a proof mass and a suspension element. The proof mass is disposed on the suspension element over the etch pit. The microsensor further comprises a first membrane electrode disposed over the etch pit opposing the proof mass to provide a capacitive sensor of the accelerometer.

The membrane electrode has a plurality of apertures defined therethrough communicating space within the etch pit with space above the membrane electrode so that squeeze film damping is substantially reduced.

In another embodiment the substrate has two etch pits defined therein and two corresponding membrane electrodes disposed thereover. The wafer bonded second substrate is bulk micromachined in the form of a torsion element extending over both of the etch pits. The proof mass is disposed over a first one of the etch pits so that the second substrate forms a differential sensor.

In still a further embodiment the wafer bonded second substrate is a bulk micromachined substrate having a thin film defined therein. The thin film is positioned over the etch pit and the wafer bonded second substrate is assembled with the thin film over the etch pit in the first substrate. In one embodiment the thin film is a pyroelectric thin film and the microsensor forms an infrared detector. In another embodiment the thin film is an acoustic membrane which forms part of an acoustic sensor. For example, the thin film is a single crystal silicon membrane. Alternatively, the pyroelectric thin film is a thin film of lead titanium oxide, $PbTiO_3$. In general the thin film comprises a thin layer disposed on an epitaxial semiconductor etch stop layer. In the case of an infrared detector, the thin film is supported over the etch pit by a plurality of narrow supporting bridges to provide low thermal conductance with the substrate.

In the case of an accelerometer the wafer bonded second substrate comprises differential sensing capacitors, and the CMOS circuit comprises a source of two DC reference voltages, a switching network, a pair of reference capacitors and a feedback amplifier. The DC voltages are switched by the switching network across the sensing capacitors and the reference capacitors. The feedback amplifier is coupled to the reference capacitors and generates a feedback voltage proportional and opposite to a differential voltage appearing across the sensing capacitors to thereby null the differential voltage. The output of the feedback amplifier is an output indicative of acceleration sensed by the sensing capacitors. In the illustrated embodiment the DC voltage source, switching network, matched pair of reference capacitors and the feedback amplifier are fabricated within an integrated circuit. The pair of sensing capacitors are fabricated within a microelectromechanical systems device.

The invention is also defined as a method of providing a microsensor comprising the steps of forming an integrated circuit in a first substrate, and defining at least one etch pit in the first substrate. At least a portion of a microsensor is bulk machined in a second substrate. The second substrate is wafer bonded to the first substrate after formation of the integrated circuit in the first substrate at temperatures below those which would affect the integrated circuit to provide an integrated circuit microelectromechanical device. The integrated circuit is fabricated using CMOS technology. The method in some embodiments further comprises fabricating a thin film suspended over the etch pit.

The invention is alternatively defined as an improvement in a method for controlling a CMOS integrated microelectromechanical device having a capacitive bridge defined therein comprising the steps of generating a switched DC voltage across a pair of sensing capacitors and simultaneously across a pair of matched referenced capacitors. A feedback voltage is generated and applied to the sensing capacitors to null out any differential voltage imbalance between the sensing capacitors caused by changes in capacitance in the sensing capacitors due to acceleration applied thereto. An output signal is generated which is indicative of the acceleration at least proportional to the feedback voltage.

The sensing capacitors may be replaced by piezosensing elements, the reference capacitors replaced by matched reference piezoelements and the step of generating the feedback circuit then applies a hulling feedback voltage to the piezosensing elements.

The invention may be better visualized by turning to the following drawings wherein like elements are referenced by like numerals.

The invention and its various embodiments may now be better understood by turning to the following detailed description.

DETAILED DESCRIPTION OF THE PREFERRED EMBODIMENTS

The invention is directed to a process of providing CMOS integrated microsensors which provides great sensor diversity on a common platform. In the illustrated embodiment described below, the CMOS integrated microsensor process will be described in connection with accelerometers and gyroscope sensors, infrared sensor and surface acoustic wave oscillators (SAW), chemical sensors and signal processing elements. However, it is to be expressly understood that the invention is not limited by the illustrated embodiments, but may be applied in any application now known or later devised.

The devices of the invention are fabricated by wafer bonding together the bulk micromachined sensor substrate with the surface machined CMOS interface substrate. The CMOS integrated microsensor process of the invention incorporates low temperature wafer bonding of ideal bulk micromachine sensor and actuator structures with low cost CMOS microelectronics and surface micromachined structures. The CMOS interface chip, is prepared by conventional commercial processes, is equipped with bonding contact areas which may simply be exposed substrate areas or specially fabricated contact pads. The process uses low temperature wafer bonding methods which include metallurgies which have now been proven for commercial microsensor volume production. Gold to silicon eutectic bonding at less than 300 degrees centigrade and related low temperature gold base bonding methods are also proven low cost and CMOS compatible through their use in standard die attachment packaging. It is important to note that devices made according to this process do not require hermetic bonding to either glass or silicon substrates, thereby avoiding the high temperature, more expensive processing required for many pressure sensor applications. However, it should also be noted that even these high temperature wafer bonding fabrication processes are shown to be low cost and high volume production suitable for automotive pressure sensors. Thus, the wafer bonding processes in the invention provide both diversity in MEMS applications and verified manufacturability.

The invention relies on the well known methods for post processing of a CMOS circuit die to obtain cavities, trenches and suspended structures. Post processing takes direct advantage of each mass pattern provided by the standard CMOS over glass, oxide and metal layers. This requires no other processing than a single, standard etch step. As will be discussed, this enables fine design and control of the sensor systems.

In addition, the process of the invention incorporates a suspended capacitive, position-sensor electrode which eliminates the parasitic capacitance limitations encountered in conventional microsensor systems.

Figure 1:
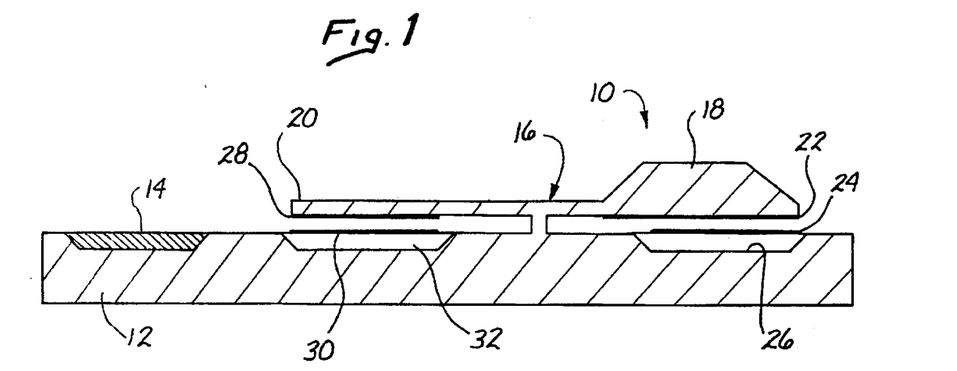
FIG. 1 is a simplified cross-sectional view of a MEMS accelerometer fabricated according to the invention.

The process of the invention provides an optimized vibration or acceleration sensor mechanical response as depicted in FIG. 1. Conventional surface micromachine accelerometers for automotive collision detection for example are constrained to small proof mass values, large spring constant suspensions and the resulting resonant frequencies are greater than 20 kHz. These devices have low noise input stages with sensitivities of $10^{-2}$ g/Hz$^{1/2}$, which are adequate for large signal applications. However, since the reduction of input noise is not an option for low power applications, it is necessary for a new design to be provided. It is important to note that the proof mass displacement response of a vibration sensor for an input signal frequency below the resonance frequency is proportional to the inverse of the resonance frequency squared, $1/f_r^2$, because the response above resonance decays rapidly as a second order system. The vibration sensor of the invention takes advantage of proven thin cantilevers using a $p^+$ etch stop to achieve resonant frequencies of 100 to 200 Hz. At 200 Hz resonance frequency, $10^{-6}$ g input vibration signals yield proof mass displacements of approximately 6 picometers. This provides acceleration sensitivities well below $10^{-6}$ g/Hz$^{1/2}$ with easily achievable 20 micron capacitor air gaps, 1 volt low power capacitor sensing bias signals, and 100 nV/Hz$^{1/2}$ input noise in the micropower interface stages. In fact, the sensitivity is determined by the ratio of the interface amplifier resolution to the bias, e.g. 100 (nV/Hz$^{1/2}$)/V. The displacement sensitivity is simply the ratio of the resolution to the value of the capacitor gap.

Acceleration sensors of the invention also depend upon the pulse processing performance of the CMOS interface chip to yield both low parasitic capacitance and squeeze film damping control. Parasitic capacitance for conventional systems, where an electrode film is dielectrically isolated on a silicon substrate, yields an electrode-to-silicon ground plane capacitance of 30 to 40 pF/mm$^2$ for a typical 1 micron dielectric thickness. Since a typical 20 micron air gap capacitance sensor operates with a 0.4 pF/mm$^2$ capacitance, the well known parasitic capacitance shunts the sensor output signal and attenuates the input by a factor of approximately 80. The electrode system of the invention, which is supported by a free-standing membrane electrode over a pit, which electrode is produced by standard micromachining, reduces the parasitic capacitance to a negligible value. It should be noted that this is necessary and it can be shown that circuit methods for parasitic compensation such as guard circuits, do not remove the degradation sensitivity which results from presenting the attenuating capacitance bridge input signal to a preamplifier with an input referred noise. Thus, the vibration sensor of the invention realizes the full advantage of the sensitivity which may be obtained from a low power circuit.

Figure 2:
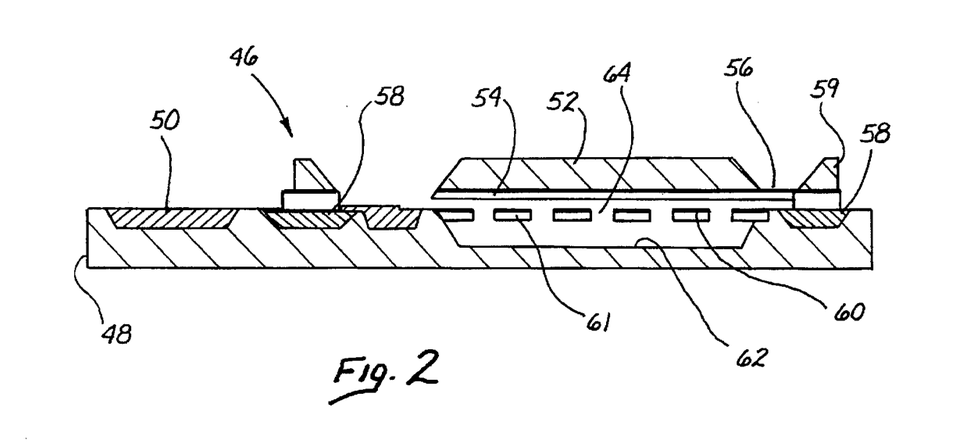
FIG. 2 is a simplified cross-sectional view of another embodiment of a MEMS accelerometer fabricated to the invention.
Figure 3:
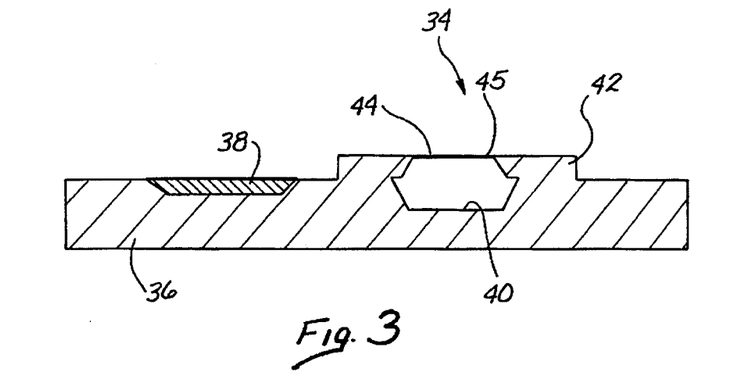
FIG. 3 is a simplified cross-sectional view of a MEMS infrared or acoustic sensor fabricated according to the invention.

Finally, the vibration sensor of the invention is provided with a standard squeeze film damping control simply by providing the supported electrode over a pit with apertures defined through electrode films 24 and 30 as shown in the alternative embodiment of FIG. 2. Here, a p– etch stop epilayer 54 forms the proof mass support cantilever, providing a single crystal support which is an ideal accelerometer mechanical element. For some applications, where low drift of the DC sensor bias is required, the use of differential sensing electrodes is warranted such as shown in the embodiment of FIG. 1. In such a case, the vibration sensor includes a proof mass deflection electrode located under the proof mass as shown in FIGS. 1 and 3 for acceleration sensing and a reference electrode located under a static region of the same sensor die, such as in a cavity formed under static supporting structure 59. The differential measurement of these reference capacitive electrodes, surrounding the proof mass capacitor electrode, eliminates errors due to variation in height of the supported sensor structure where variations in height occur due to thermal expansion or assembly variations.

Finally, appropriate electrode design relaxes requirements and lateral alignment to the wafer bonding to a convenient range of 20 to 30 microns. In the embodiment of FIG. 2, the accelerometer, generally denoted by reference numeral 46, is comprised of a substrate 48 in which CMOS interface chip or circuit 50 has been fabricated. A proof mass 52 disposed on p– etch stop epilayer 54 is defined on a single crystal cantilever 56. Proof mass 52 and cantilever 56 are separately wafer-bonded to substrate 48 onto predefined contact pads 58. A parasitic electrode 60 is suspended over a large etch pit 62 defined into substrate 48, again which electrode 60 is disposed on a p– etch stop epilayer 61. A plurality of holes 64 are defined through electrode 60 and epilayer 61 to provide for squeeze film damping.

FIG. 1 is a simplified cross sectional view of an accelerometer, generally denoted by reference numeral 10, which uses a torsion suspension element 16 to provide linear sensing and electrostatic feedback control. Accelerometer 10 is comprised of a semiconductor substrate 12 in which conventional CMOS sensor interface electronics 14 have been fabricated. Accelerometer 10 includes a torsion suspension element 16 extending above substrate 12 which is comprised of a proof mass 18 on one end and a counterbalance capacitive plate 20 on the opposing end.

Figure 2A:
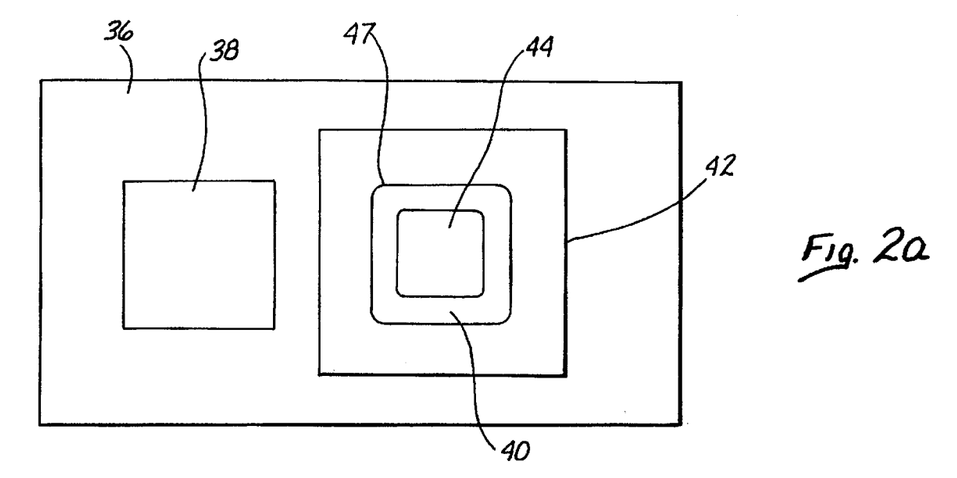
FIG. 2a is a top plan view of the device of FIG. 2.

Torsion suspension element 16 is a bulk micromachined substrate which is then wafer-bonded to substrate 12. The underside of proof mass 18 includes a capacitive electrode 22 opposed from a zero parasitic differential sensing electrode 24, which is suspended across a micromachined cavity 26 defined into substrate 12. Similarly, the opposing end of plate 20 of torsion suspension element 16 is provided with a capacitive plate 28 in a second zero parasitic differential sensing electrode 30 suspended above a cavity 32 machined into substrate 12. Sensing plates or electrodes 24 and 30 are thin film layers suspended by bridges (similar in nature to bridges 47 shown in FIG. 2a) which are fabricated using conventional surface micromachining techniques. The depth and size of cavities 26 and 32 are such that the suspension of electrodes 24 and 30 above cavities 25 and 32 avoids parasitic capacitance limitations typically encountered in conventional microsensor systems.

Sensing electrodes 24 and 30 and capacitive plates 22 and 28 are electrically coupled by conventional means in circuit to each other and to circuitry within integrated circuit 14 to provide a differential capacitive sensing for accelerometer 10. In the event that wafer-to-substrate separation of wafer bonded element 16 may vary due to temperature or process variations, an additional third electrode may be provided in similar manner as described above for use as a reference to null out the variation.

The operation of the infrared sensor of the illustrated embodiment as shown in FIG. 3 is based on infrared motion detection by high sensitivity microsensors operating in a differential mode. Conventional infrared motion sensors use low responsivity, nonintegrated pyroelectric components to obtain a simple measurement of the difference in radiation received by a pair of elements due to motion of an infrared target in the system field of view. The devices in the invention use thin film, ideal pyroelectric lead titanium oxide and other metal oxide films with responsivities demonstrated of the order of $4\times10^{-8}$ cm$^2$/K which is equal to the accepted bulk values. The sensor elements fabricated by the invention have active areas in the range of 0.01 to 1 mm$^2$, are coupled to low capacitance input stages in the CMOS interface circuits, and will provide up to 10 V/K responsivity. By providing this responsivity, with optimized low power and low noise interface circuits operating at 100 nV/Hz sensitivity, the infrared system noise is limited by its own fundamental thermal noise. In the illustrated embodiment, the noise equivalent power is of the order of $3\times10^{-10}$ W/Hz$^{1/2}$. Infrared sensitivities of this high performance are typically only available in an expensive laboratory sensors and exceed the sensitivities of low cost sensors by a factor of 10 to 100. This improvement in sensitivity can yield a reduction in data acquisition time for the same integrated signal-to-noise in a signal by a factor of 100 or more, thereby resulting in more precise and faster operation.

The thermal response of an infrared sensor defines not only its frequency response, but also its thermal noise limits. Thermal noise, controlled by thermal conductivity the sensor's support structure, increases with increasing thermal conductance. Only a sensor structure which allows a fabrication of low thermal mass sensor elements, and low conductance supports can simultaneously provide high speed and low noise. The infrared sensors of the invention use a pyroelectric film deposited on a p– etched stop membrane. Here, the sensor support provides 0.1 to 0.01 second thermal time constants with thermal conductance supplied by narrow membrane supporting bridges 47 as shown in the top plan view of FIG. 2a. In addition, the simple fabrication of an etch pit or cavity 40 under the sensor, which is created at the same time as all the additional sensor structures on the CMOS die, provides tuning of the thermal conductance due to the interlying atmosphere. Lithography for this structure is not critical and the delineation of the sensor chip and its membrane is performed on the etch stop layer, which in the illustrated embodiment is the front side of the wafer having a p+ or p+/n epilayer. For these designs, the backside etch does not control sensor properties and does not require precise alignment.

Metal oxide, pyroelectric materials are deposited using a Sol-gel method on micromachine structures as described by K. Petersen, "Silicon as a Mechanical Material" Proceedings of the ICEE, 70, pp. 420–457 (1982). High temperature processing precedes the die attachments steps. The sol-gel methods use precursors with simple materials handling requirements to result in high volume processing and high response systems, including the fabrication of lead titanium oxide films. The sol-gel films products one micro thick layers using a rapid and simple spin deposition. Conventional, continuous or metal black infrared absorbers can be fabricated as part of a silicon Golay cell. For continuous gold, both charge collection absorption are fabricated with one metalization. Contacts are made to differential sensor element pairs or to conventional quadrant configurations.

FIG. 3 is a simplified cross sectional view of an infrared sensor fabricated according to the process of the invention which is generally denoted by reference numeral 34. Infrared sensor 34 is comprised of a substrate 36, again, in which at CMOS integrated circuit 38 has been fabricated using conventional techniques. A low thermal conductance cavity 40 is defined into substrate 12 and a wafer bonded micromachined substrate 42 having pyroelectric refractory thin film 44 defined on its upper surface is bonded to substrate 42 over cavity 40 such that thin film 44 is placed over cavity 40. Thin film 44 is disposed on an p stop epitaxial layer 45 which is suspended over cavity 40 by a plurality of thin ligaments or bridges (not shown) to reduce thermal conductivity to substrates 42 and 36. Cavity 40 in substrate 12 further reduces thermal conductance from pyroelectric thin film 44 to substrate 36. The infrared sensor of FIG. 3 includes feedback control sensor structures which eliminate pixel-to-pixel responsivity variations.

Consider now an acoustic sensor made according to the process of the invention. Acoustic sensor can be made on the same chip with the infrared and vibration sensor and is also based upon the steps of obtaining large response to power constrained interface electronics, eliminating parasitics to minimize attenuation, and providing for CMOS integrated microelectronic implementation for rapid technology transition. Although the methodology of the invention is directly usable with both piezoelectric and condenser designs for acoustic sensors, the condenser microphone approach is preferred, since it has been shown consistently to provide a 30 db sensitivity advantage over piezoelectric microphones in prior applications. The methodology of the invention permits particular advantage in that the critical requirements for low parasitic structures and squeeze film damping are both easily tuned by design. The sensor therefore is substantially similar in structure to that shown in FIG. 2 for the accelerometer with a single crystal silicon membrane similar to that shown in the infrared sensor of FIG. 3, replacing the proof mass system. The membrane deflection, caused in response to acoustic signals, is detected with picometer sensitivity using a low power interface circuit. The noise floor of such membrane base sensors is less than 35 db. This noise floor in turn is equal to the background noise and some of the most quiet structures previously devised, such as acoustically shielded rooms, which typically characterize the engineering noise control field. The sensor therefore allows low power signal processing functions to work at their full capability for their operation in any environment.

Consider now the micro accelerometer design in greater detail. Low sensitivity devices for large signal applications, such as automotive impact detection air bag deployment, are now appearing in products on the market. The next set of applications for low cost microaccelerometers include vehicle navigation control, advanced automotive braking control, manufacturing of process control, large structure monitoring control for seismic vibration response, medical instrumentation such as in balisto cardiography, and defense applications including personnel tracking and compact vehicle autonomous navigation. The common requirement for these applications is high sensitivity and stability for the microaccelerometer system. For example, inertial navigation of a moving vehicle is accomplished with an onboard microaccelerometer by twice time integrating the micro accelerometer output. This converts the vehicle acceleration signal to vehicle velocity and then to vehicle location. Inertial navigation allows autonomous control and monitoring in any environment. For some applications, inertial navigation is augmented with infrequent location waypoints from radiolink navigation aids such as in the global positioning system. For inertial navigation, uncertain acceleration measurements lead to uncertainty and derived location. For current low cost microaccelerometers, having a sensitivity of 10 milli g and a 1 Hz bandwidth, this uncertainty results in a locational uncertainty of 640 kilometers in 1 hour of operation. A typical goal for inertial navigation accelerometers is 0.1 to 1 micro g sensitivity. This yields a position location and uncertainty of 6.4 to 64 meters after 1 hour of operation. The latter sensitivity enables vehicle and personnel tracking, manufacturing and work place monitoring control systems in many environments with or without additional references.

Figure 4:
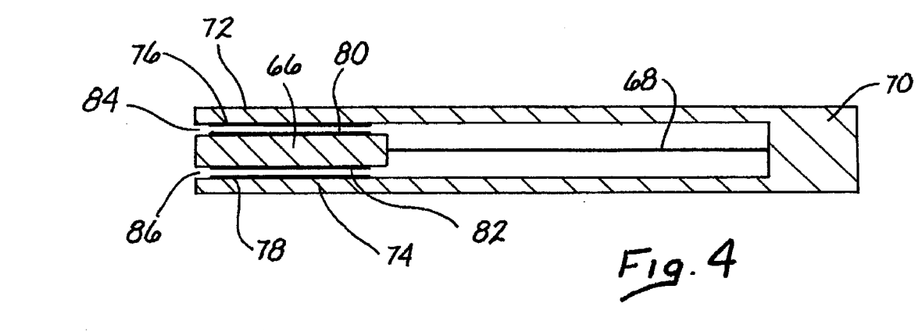
FIG. 4 is a cross-sectional view of a differential capacitive accelerometer.

A first important design step for microaccelerometers is to define the fundamental transducer response. A simplified cross sectional view of a microaccelerometer structure is shown in FIG. 4. A proof mass 66 is suspended on an elastic cantilever 68 extending from substrate 70. Proof mass 66 is disposed between substrate arm 72 and 74, the inner surfaces of which have been provided with an upper and lower differential capacitive electrodes 76 and 78, respectively. The opposing sides of proof mass 66 has similarly been provided with electrodes 80 and 82, respectively, spaced apart from substrate electrode 76 and 78 by a predefined electrode gap 84 and 86, respectively. When an acceleration, $a_s$, is applied in a direction perpendicular to suspension cantilever 68, a change in position, ds, of proof mass 66 occurs. Where signal frequency is less than the suspension resonance frequency, $2\pi f_0 = (k/m)^{1/2}$, the response of the spring mass system is simply given equation 1:

$$ds = a_s/(2\pi f_0)^2.$$

The position of proof mass 66 is determined by the position of capacitor electrode pairs 76 and 80 on the upper differential capacitor and electrode pairs 78 and 82 on the lower differential capacitor. The use of the two pairs provides a balanced system with improved immunity to temperature induced errors. Specifically, thermal expansion or contraction of the accelerometer of FIG. 4 acts weakly on both capacitor pairs and does not effect the symmetry of the structure. It is a design goal in the circuitry of FIG. 4 to match the sensor symmetry with circuit symmetry.

For typical applications of microaccelerometers, the resonance frequency of the suspension system must be greater than that of a typical signal and system vibration frequencies. Typical values for inertial navigation sensors lie in the range of 100 to 1,000 Hz. Feedback control methods, critical to linear sensor operation may be used to establish a system response different from that of natural closed loop systems.

Consider for example an acceleration of $10^{-7}$ g. According to equation 1, then, the deflection of the proof mass 66 at 100 Hz and then at 1,000 Hz is 0.025 Angstrom and 0.00025 Angstrom, respectively. These small deflection values clearly demonstrate the need for advanced, high sensitivity microelectronics.

In addition, it is important to provide a microaccelerometer with high stability, that is low noise at low frequency. Consider the required displacement and capacitance resolution. For typical fabrication methods, the electrode gaps 84 and 86 are greater than 10 microns. Thus, the changing capacitance resulting from the conditions described above result in a resolution requirement of ds/s=dC/C of $2.5 \times 10^{-7}$ and $2.5 \times 10^{-9}$, respectively, for 100 and 1,000 Hz.

Figure 5:
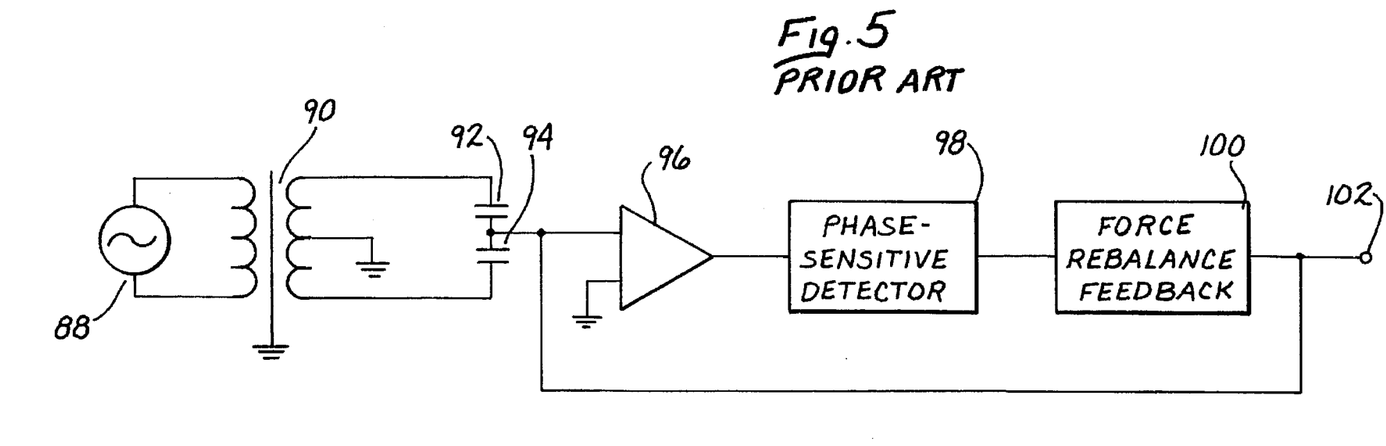
FIG. 5 is a simplified block diagram of a prior art circuit using a transformer capacitance bridge for an accelerometer.

Consider first a circuit used for a conventional macroaccelerometer used for inertial navigation and seismometry. These accelerometers employ large volume transformer bridge capacitance detectors. Precision devices provide the required performace at high cost. An AC voltage source drive 88 is coupled through a transformer 90 to drive sensor capacitor pair 92 and 94 whose output is coupled to an AC coupled gain stage 96. A phase sensitivity detector 98 takes the output of gain stage 96 and provides it to a force rebalance feedback circuit 100. The output of force rebalance feedback circuit 100 is fedback to null any capacitance difference between capacitors 92 and 94 which arises from DC drift. The output of feedback circuit 100 is then provided to a sensor output circuit 102 which is proportional to the acceleration within the desired frequency ranges.

The conventional transformer capacitance bridge provides two signals to the capacitor pair which are equal in magnitude and opposite in phase so that the magnitude and phase relationship depends only on the stability of the transformer and not on the stability of voltage source 88. The AC signal, appearing at the bridge output, is fed to gain stage 96 and is proportional to the capacitive difference between capacitors 92 and 94. The first stage amplifier 96 then detects only an AC signal at the bridge output. This stage is not required to have low noise performance over a large frequency range, but only at the high frequency of the source. The AC bridge output signal is demodulated for output application.

Feedback circuit 100 ensures capacitance difference is always at a null. If the acceleration acts to move the proof mass from its center equilibrium position, then a capacitive difference is created. The sensor and output signal is, of course, the force applied to the sensor system to restore a null capacitance. For closed loop operation, the drift and voltage source frequency, amplitude and amplifier offset voltage have a negligible effect on the sensor output. Specifically, a large open loop gain for the system of FIG. 5 suppresses the effect of such drift. For example, if the amplitude of source 88 varies, the null condition at first amplifier stage 96 is not disturbed and sensor output variation is attenuated by a factor equal to the open loop gain.

The resolution of device shown in FIG. 5 is determined by the ratio of the front end voltage noise, which is typically less than 100 nV/Hz$^{1/2}$ to drive amplitude which is typically 10 volts. Thus, resolution of less than $10^{-8}$/Hz$^{1/2}$ is readily achieved. While circuitry of FIG. 5 clearly meets the measurement and resolution requirements in an inertial system, the need for a large precision transform 90 is clearly incompatible with low cost microsystems.

Figure 6:
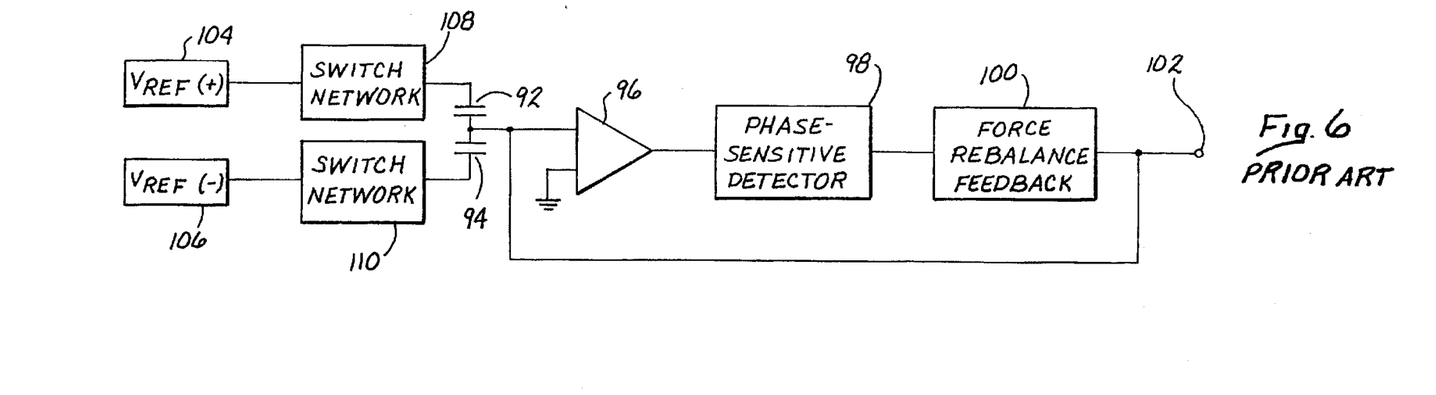
FIG. 6 is a simplified block diagram of a prior art circuit using a switched network capacitance bridge for an accelerometer.

The conventional response to this is to utilize a switched capacitor bridge such as shown in FIG. 6. The operation of the circuitry of FIG. 6 is similar to that shown in FIG. 5 with the exception of two opposite phase drive signals previously provided by transformer 90 are now provided by two DC voltage references 104 and 106 through two conventional analog switching networks 108 and 110, respectively.

A switched capacitance bridge such as shown in FIG. 6 suffers from a critical disadvantage, namely reduced sensitivity and resolution. The bridge output of FIG. 6, which appears at first stage amplifier 96 input depends upon both the capacitive difference and the difference between the two voltage references 104 and 106. The voltage references, therefore, directly determine the output stability. In order to obtain the simple resolution requirements discussed above, variation of the reference amplitude voltage must be no greater than $2.5 \times 10^{-7}$ to $2.5 \times 10^{-9}$. The voltage reference system shown in FIG. 6 may be modified but in some implementations the requirement for phase and amplitude stability is unchanged. Stable voltage references with variations smaller than $10^{-4}$ become impractical for low cost integrated systems. Therefore, the conventional integrated capacitance bridge sensitivity as shown in FIG. 6 fails short of the requirements of an inertial system by a factor of up to 1000.

Figure 7:
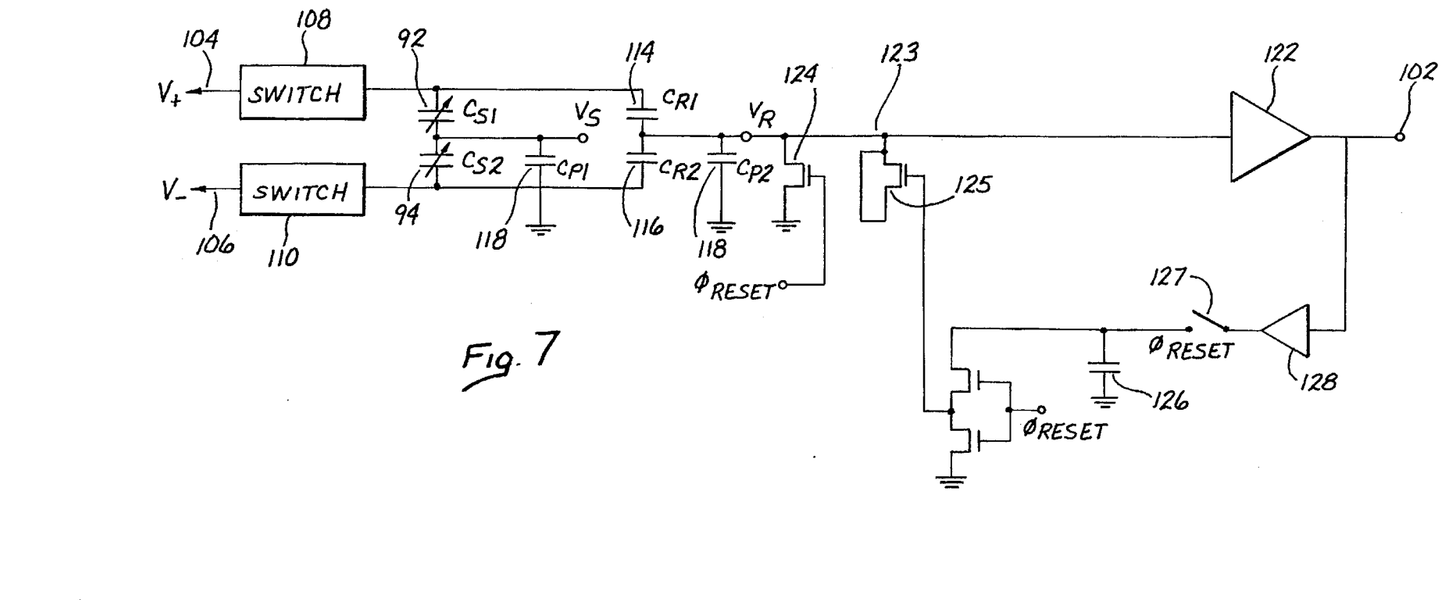
FIG. 7 is a simplified schematic of an improved circuit for use in a MEMS accelerometer using capacitive elements.

FIG. 7 illustrates a capacitive feedback bridge of the invention. The bridge, generally denoted by reference numeral 112, is comprised of a v+ DC reference signal 104 and a v− DC reference signal 106, which are switched by switching network 108 and 110 as in the case of a conventional circuit shown in FIG. 6. These voltages are applied to sensing capacitors 92 and 94 as before in an accelerometer such as shown in FIG. 4.

Matched reference capacitors 114 and 116 are also coupled to switches 108 and 110 and parallel with sensing capacitors 92 and 94. Parasitic capacitance within the substrate is indicated by parasitic capacitors 118. Matching of capacitors 114 and 116 is accomplished by following proper layout procedures within the same substrate 70.

The output 120 from capacitors 114 and 116 is provided to a feedback amplifier 122 whose output is then provided on feedback line 124 to DC feedback 104, for example. The feedback system of FIG. 7 maintains a null at junction 120 of reference capacitors 114 and 116 and thus a null will be provided at the junction of capacitors 92 and 94. The sensor output is now independent of supply bias. Thus the feedback bridge accomplishes the performance of an ideal Blumlein transformer bridge by using the symmetry of the on-chip capacitor pair 114 and 116. Temperature independence relies simply on the symmetry of reference capacitors 114 and 116. In addition, the requirements of the amplifier are greatly relaxed over those of conventional systems shown in FIGS. 5 and 6.

An additional feature of the feedback bridge of FIG. 7 is that the capacitor detection module employs new methods for elimination of injected charge errors. The preferred embodiment of the CMOS capacitive position sensor employs a CMOS switch device 124 driven by $\phi_{reset}$ which periodically resets the input node 119 to ground potential shown illustratively in connection with FIG. 7. The signal, $_{reset}$ is a clock signal generated by conventional clock circuitry, which as a frequency which is higher than any or at least most of the measurement expected to be taken.

Reset switch 124 injects an error signal, however, into this input stage. This error, referred to as charge injection error, produces a signal offset. This signal offset may vary with power supply amplitude and temperature, thus degrading stability.

The feedback bridge of FIG. 7 therefore incorporates an improvement for eliminating charge injection error. Here, the measurement is divided into two phases, a phase where reset switch 124 is operated and a phase where the drive signal V is applied to the reference and sensor capacitors through switches 108 and 110. During the "reset" phase the output signal at node 102 is sampled and compared to ground potential by an operational amplifier 128. The amplified error signal is now applied to a compensating reset device 125 coupled to node 123 through switch 127 driven by $\phi_{reset}$. Compensating reset device 125 is a FET transistor having its gate coupled to switch 127 and capacitor 126, its source floating, and its drain coupled to node 123 to act as a gate-drain capacitor. The function of compensating reset device 125 is to supply a compensating charge, opposite in polarity to the charge injection voltage, forcing the input node 123 to zero potential. Operational amplifier 128 controls the potential supplied to the gate of the compensating reset device 125 to maintain a zero potential at node 123. The clock signal, reset occurs or goes active only during the reset phase of the measurement. The voltage applied to the compensating reset device 125 is stored on capacitor 126. Thus, the same voltage as was previously applied to compensating reset device 125 to zero out the injected charge on node 123 remains during the measurement phase. As a result, during the measurement phase, no injection charge error is present at input node 123 and the undesireable effects on stability caused by such injection charges is avoided.

Other methods with have been proposed to eliminate charge injection error suffer from limited accuracy. These methods have relied on a separate measurement of charge injection error voltage and a signal voltage with which includes charge injection error and a superimposed signal. Differencing these two measurements can in principle eliminate charge injection. However, since typical signal resolution requirements are 10 nV, and charge injection errors are $10^6$ times larger, 10 mV, the requirements on linearity and common mode rejection are impractical. This compensating circuit provides a self-calibrated solution for charge injection with a limited number of components.

Figure 8:
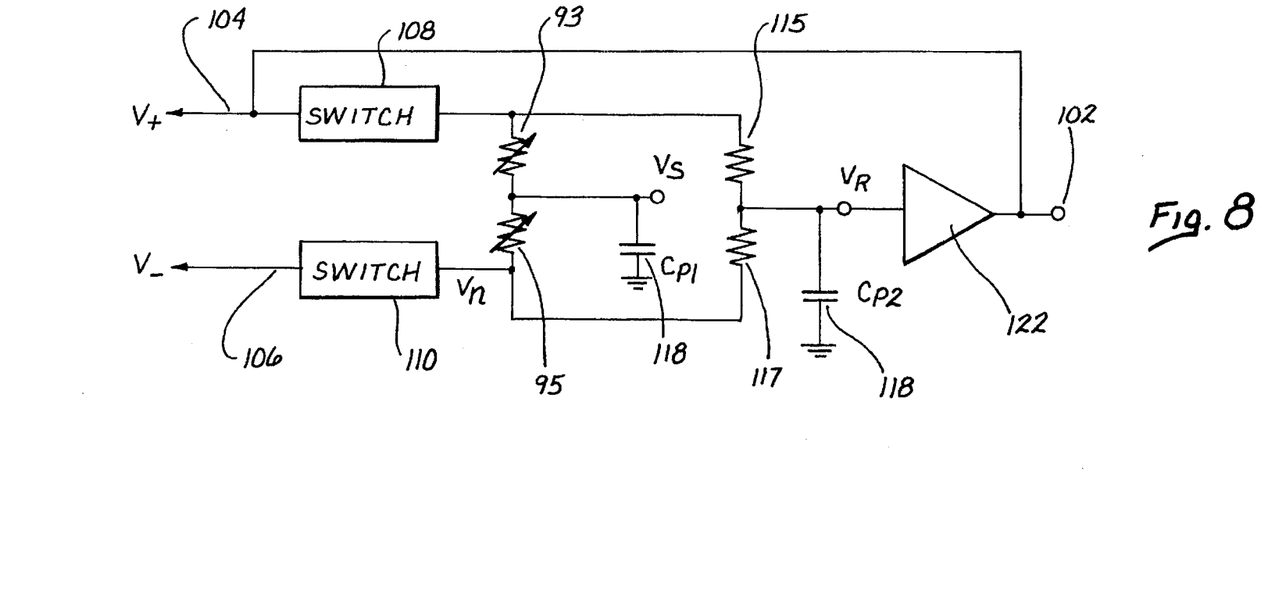
FIG. 8 is a simplified schematic of an improved circuit for use in a MEMS accelerometer using piezo-elements.

The circuitry of FIG. 7 can also be implemented in the form of a piezoresistive bridge with sensor and reference elements being piezoresistors, piezodiodes or piezotransistors in place of the capacitive elements shown. FIG. 8 illustrates one such embodiment where piezoresistors or elements 93 and 95 have been substituted for sensing capacitors 92 and 94 respectively, and reference resistors 115 and 117 substituted for reference capacitors 114 and 116 respectively.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A CMOS integrated microsensor comprising:
   a first semiconductor substrate having surface machined therein an etch pit;
   a CMOS circuit fabricated within said first substrate; and
   a semiconductor, wafer-bonded second substrate disposed on said first substrate over said etch pit, said wafer bonded second substrate being bulk micromachined from said first substrate to define bulk-micromachined structures therein, including at least a portion of a sensor element within said second substrate disposed opposite said etch pit in said first semiconductor substrate, said CMOS circuit being fabricated within said first substrate separately from said bulk-micromachined structures in said second substrate, said second substrate being bonded to said first substrate at temperatures below that which would affect said CMOS circuit fabricated in said first substrate,
   whereby said microsensor is fabricated with said CMOS circuit and combined with microelectromechanical structures as fabricated by bulk machined processes.

2. The microsensor of claim 1 wherein said microsensor is an accelerometer and said wafer bonded second substrate comprises a proof mass and a suspension element, said proof mass being disposed on said suspension element over said etch pit, and further comprising a first membrane electrode disposed over said etch pit opposing said proof mass to provide a capacitive sensor of said accelerometer.

3. The microsensor of claim 2 wherein said membrane electrode has a plurality of apertures defined therethrough communicating space within said etch pit with space above said membrane electrode so that squeeze film damping is substantially reduced.

4. The microsensor of claim 2 wherein said substrate has two etch pits defined therein and two corresponding membrane electrodes disposed thereover, and wherein said wafer bonded second substrate is bulk micromachined in the form of a torsion element extending over both of said etch pits, said proof mass being disposed over a first one of said etch pits so that said second substrate forms a differential sensor.

5. The microsensor of claim 1 wherein said wafer bonded second substrate is a bulk micromachined substrate having a thin film defined therein, said thin film being positioned over said etch pit and said wafer bonded second substrate being assembled with said thin film over said etch pit in said first substrate.

6. The microsensor of claim 5 wherein said thin film is a pyroelectric thin film and said microsensor forms an infrared detector.

7. The microsensor of claim 5 wherein said thin film is an acoustic membrane.

8. The microsensor of claim 7 wherein said thin film is a single crystal silicon membrane.

9. The microsensor of claim 6 wherein said pyroelectric thin film is a thin film of lead titanium oxide.

10. The microsensor of claim 5 wherein said thin film comprises a thin layer disposed on an epitaxial semiconductor etch stop layer.

11. The microsensor of claim 5 wherein said thin film is supported over said etch pit by a plurality of narrow supporting bridges to provide low thermal conductance with said substrate.

12. The microsensor of claim 1 wherein said wafer bonded second substrate comprises differential sensing capacitors, and wherein said CMOS circuit comprises a source of two DC reference voltages, a switching network, a pair of reference capacitors and a feedback amplifier, said DC voltages being switched by said switching network across said sensing capacitors and said reference capacitors, said feedback amplifier being coupled to said reference capacitors and generating a feedback voltage proportional and opposite to a differential voltage appearing across said sensing capacitors to thereby null said differential voltage, output of said feedback amplifier being an output indicative of acceleration sensed by said sensing capacitors.

* * * * *